United States Patent [19]
Schneider et al.

[11] 4,094,838
[45] June 13, 1978

[54] TRIGLYCERIDE OIL-DERIVED WATER-DISPERSIBLE URETHANE RESIN COATINGS

[75] Inventors: Wilma J. Schneider; Lyle E. Gast, both of Peoria, Ill.

[73] Assignee: The United States of America as represented by the Secretary of Agriculture, Washington, D.C.

[21] Appl. No.: 803,192

[22] Filed: Jun. 3, 1977

[51] Int. Cl.² ............................................. C08G 18/28
[52] U.S. Cl. .......................... 260/22 TN; 260/18 TN; 260/29.2 TN; 260/33.2 R; 260/33.4 UR; 260/404.5
[58] Field of Search .......... 260/18 TN, 22 TN, 404.5, 260/29.2 TN, 33.2 R, 33.4 UR

[56] References Cited
U.S. PATENT DOCUMENTS

| | | | |
|---|---|---|---|
| 3,485,779 | 12/1969 | Gast et al. | 260/18 TN |
| 3,637,539 | 1/1972 | Wolff et al. | 260/18 TN |
| 3,759,873 | 9/1973 | Hudak | 260/18 TN |

OTHER PUBLICATIONS

J. Amer. Oil Chem. Soc., vol. 45, No. 7, pp. 534–536 (1968) Gast et al.
J. Amer. Oil Chem. Soc., vol. 46, No. 7, pp. 360–364 (1969) Gast et al.
J. Amer. Oil Chem. Soc., vol. 43, No. 6, pp. 418–421 (1966) Gast et al.

*Primary Examiner*—Eugene C. Rzucidlo
*Attorney, Agent, or Firm*—M. Howard Silverstein; David G. McConnell; Curtis P. Ribando

[57] ABSTRACT

A novel class of water-dispersible urethane resin coating compositions is prepared from triglyceride oils by a three-step, one kettle process. The steps of preparation are all characterized by low energy reaction conditions and the resultant coating compositions are unexpectedly water-dispersible at acid values as low as about 30.

13 Claims, No Drawings

TRIGLYCERIDE OIL-DERIVED WATER-DISPERSIBLE URETHANE RESIN COATINGS

BACKGROUND OF THE INVENTION

1. Field of the Invention

This invention relates to water-dispersible urethane resin coatings prepared from drying or semidrying oils and having acid values lower than those heretofore known in the prior art.

2. Description of the Prior Art

Alkyds containing vegetable oil fatty acids have long been important as vehicles in protective coatings for exterior use on wood. Improvement of certain of their properties, e.g., durability, mildew and alkali resistance, has been attempted by chemical modification of the basic vehicle, but the processing conditions are rather extensive, usually requiring temperatures of about 210° C. for about 10 hours.

Another approach to improve properties has been to prepare from vegetable oils synthetic alkyd resins containing amide linkages derived from amino alcohols. Gast et al., U.S. Pat. No. 3,485,779 and Gast et al., J. Amer. Oil Chem. Soc. 46(7): 360-364 (1969) teach the preparation of coating compositions by the modification of vegetable oils to urethane polyesteramides. These were prepared by first converting the vegetable oils with excess diethanolamine to their corresponding N,N-bis(2)-hydroxyethyl fatty amides (HEFA) and glycerol. The isolated HEFA were then reacted with dibasic acids or anhydrides at 140°-150° C. for 6-24 hours to yield the hydroxyl-terminated polyesteramides, which were finally modified with diisocyanate. Schneider et al., J. Paint Technol. 44(575): 58-63 (1972) later demonstrated a feasible commercial method to prepare the urethane polyesteramides in which the isolation of the intermediate hydroxyamides is eliminated.

Recently, petrochemical shortages and new laws restricting atmospheric organic solvent emissions have stimulated interest in water-dispersible coating vehicles. A number of these systems have been developed, but the processing energy required was high and similar to that for the conventional alkyd systems; and except for latex emulsion systems, water dispersibility required a minimum of 1 milliequivalent of carboxyl per gram of resin. This translates into an acid value of about 56.

SUMMARY OF THE INVENTION

We have discovered an improvement over the urethane polyesteramide process of Gast et al., supra, by which novel coating compositions can be prepared in a three-step, one kettle process under comparatively mild processing conditions, and the compositions are unexpectedly characterized by water dispersibility at acid values as low as about 30. The coating compositions are urethane resins prepared by:

a. amidating a drying or semidrying triglyceride oil with a diolamine in an oil:amine mole ratio of about 1:2 to yield a mixture of 2-monoglycerides (MG) and N,N-bis hydroxyalkyl fatty amides (HAFA) in a MG:HAFA ratio of approximately 1:2;

b. reacting the MG-HAFA mixture from step (a) with a sufficient amount of an anhydride under sufficient conditions to convert a portion of said MG and said HAFA to the corresponding MG and HAFA half esters and to provide an acid value in the range of about 30-70 in said urethane resin coating compositions;

c. reacting the resultant MG, MG half ester, HAFA, and HAFA half ester mixture from the previous step with a diisocyanate thereby polymerizing the components of said mixture into a urethane resin; and d. recovering said urethane resin prepared in step (c).

DETAILED DESCRIPTION OF THE INVENTION

STEP A. AMINOLYSIS

The basic starting material for use in this invention is any drying or semidrying oil as known in the art and as defined for example in "Organic Coatings, Properties, Selection, and Use," by A. G. Roberts, National Bureau of Standards, U.S. Department of Commerce, Building Science Series 7, pages 5-6, February 1968. These oils are mixed triglycerides of saturated and unsaturated fatty acids and are predominantly C-18 fatty acids. Their drying ability is a function of unsaturation, with the more highly unsaturated oils drying more readily. Linseed oil, which has a relatively high percentage of diunsaturated acids (linoleic) and triunsaturated acids (linolenic), is preferred for use in the instant invention. However, it is understood that other drying oils such as tung, dehydrated castor, perilla, or oiticica, and semidrying oils such as soybean, safflower, or all could be substituted as substantial equivalents thereof. It is preferred that the starting oil is alkali refined having an acid number less than about 0.2.

The preferred amidating agent is diethanolamine, though it is understood that other diolamines could be substituted as equivalents thereof. The unexpected advantages of the invention are obtained by employing a mole ratio of triglyceride to diolamine as nearly as possible to 1:2. At this proportion, the reaction product contains approximately a 1:2 (33%:67%) mixture of MG and N,N-bis hydroxyalkyl fatty amide (HAFA). This is unexpected from previous work in which a 1:3 ratio of triglyceride:diethanolamine resulted in only a 71% yield of the amide. We have found that only at this critical 1:2 ratio of starting materials will be resultant aminolysis reaction mixture contain essentially all difunctional hydroxy materials, either as the MG or the HAFA. At lower ratios, the product contains excess amine which acts as a trifunctional agent promoting crosslinking and gelling in the subsequent urethane modification. At higher ratios, the product contains diglyceride which acts as a chain stopper inhibiting polymerization.

The aminolysis is a catalyzed reaction, preferably with sodium methoxide at about 110° C. for 30-40 minutes. The temperature is not critical and other temperatures in the range of about 25°-110° C. could be used if the reaction time is adjusted accordingly.

STEP B. HALF ESTER FORMATION

In the prior art teachings of Gast et al., supra, the isolated HEFA were typically refluxed for 6-24 hours at 140°-150° C. with dibasic acids or anhydrides to produce full esters. It has now been found that by introducing carboxyl groups into the 1:2 mixture of MG and HAFA from the aminolysis step by means of a low temperature reaction with an anhydride, a half ester intermediate to the water-dispersible urethane resin is formed.

The preferred anhydride is phthalic, though any aryl or aliphatic anhydride having at least four carbon atoms could be substituted as equivalents thereof. These include, for example, succinic, maleic, dichloromaleic, glutaric, tetrahydrophthalic, endic, hydrogenated endic, chlorendic, and trimellitic anhydrides, and also dianhydrides such as pyromellitic and 3,3',4,4'-benzophenone tetracarboxylic. Carboxyl groups are introduced into the polymer via opening of the anhydride ring and esterification with either the MG or the HAFA at one of the hydroxyl sites. This reaction requires a high purity anhydride (>99.9%). Free acid impurity will not react under the mild reaction conditions but remains insoluble, causing cloudiness in the final product. Resin acid values in the range of about 30–70 are obtained by providing a mole ratio of anhydride:total MG and HAFA in the range of from about 0.31:1.0 to about 0.85:1.0. However, for the purpose of obtaining the best film properties in the final product, it is preferred to maintain an acid value in the range of about 30–50. This would require a mole ratio range of from about 0.31:1.0 to about 0.56:1.0.

The reaction temperature is preferably held at about 85° C., though other temperatures within the range of about 80°–100° C. would also be operable. At 85° C., half ester formation is complete in approximately 0.5 hour. Insofar as the anhydride carboxyls which remained unesterified would impart sufficient acidity to the medium to inhibit the subsequent urethane modification, they are preferably neutralized. The addition of stoichiometric quantities of triethylamine to form the amine salts of the carboxyls is sufficient to effect neutralization.

STEP C. URETHANE MODIFICATION

The mixture of MG, MG half esters, HAFA, and HAFA half esters from Step (B) are reacted with a diisocyanate in a urethane modification. The basic reaction is represented as follows:

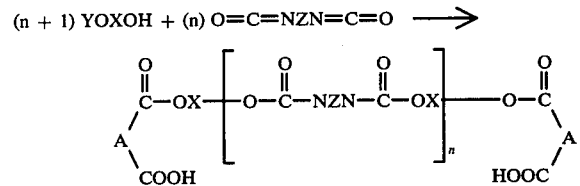

wherein:

X is randomly

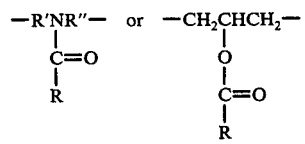

where each R is randomly selected from the fatty acid radicals derived from the starting oils, and R' and R" are each independently selected from $C_1$–$C_6$ straight or branched alkylene groups;

Y is —H or

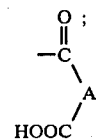

A and Z are each independently selected from substituted or unsubstituted alkyl, aryl, or cycloaliphatic groups; and average value for $n$ = 1.3–5.3.

As apparent from the above reaction, the difunctional diisocyanate polymerizes the components of the mixture from the previous step by reacting with the available hydroxyls. The degree of polymerization is controlled by the HAFA and MG half esters which act as chain stoppers. Sufficient diisocyanate is added to the reaction mixture to react with all of the remaining free hydroxyls. Since the MG, HAFA, and diisocyanate are all difunctional, the amount of diisocyanate per mole of MG and HAFA is calculated according to the following formula:

$$\text{moles diisocyanate} = (\text{moles MG} + \text{HAFA}) - \frac{(\text{moles anhydride})}{2}$$

Thus, the molar ratio of diisocyanate:(MG+HAFA) would range from about 0.85:1 to about 0.58:1 for said values of 30–70, respectively, and from about 0.85:1 to about 0.72:1 for the preferred acid values of 30–50, respectively.

The preferred diisocyanate is tolylene diisocyanate (TDI) which normally exists as a mixture of the 2,4- and 2,6-isomers. It is understood that other difunctional isocyanates as defined above could be substituted as substantial equivalents of TDI.

At the start of the urethane modification, an organic solvent is added to the reaction mixture prior to or simultaneously with the diisocyanate. Anhydrous benzene, xylene, hexane, mineral spirits, and other aliphatic and aromatic solvents can be used, though toluene is preferred. The mixture is heated to about 50° C. and held at that temperature until the reaction is complete, as determined for example by the disappearance of the —N=C=O band in the infrared at 2770 cm.$^{-1}$. This generally takes about 2 hours. Molecular weights range from 1590 to 3710 for the resultant polymers having acid values in the range of 70 to 30, respectively.

The novel urethane resin coating compositions are recovered in a water-dispersible form by the addition of another solvent material which permits the reaction solvent to be removed by preferential distillation under reduced pressure, and which is suitable as a cosolvent in the subsequently prepared aqueous dispersions. 2-Butoxyethanol and 1-methyl-2-propoxyethanol are particularly suited for this purpose. Effective proportions of resin to cosolvent are in the range of from about 50:50 to about 90:10 with the preferred range being 67:33 to 85:15. Of course, within these limits, the resins with the higher acid values require less cosolvent.

When all of the reaction solvent is removed, water is added to the resin and cosolvent. The mixture is then dispersed by mechanical stirring or other conventional means of dispersing that avoids introduction of excessive air which could result in oxidation of the resinous material. It is preferred to use deionized water in an amount sufficient to yield a 10–30% resin concentration in the final water-cosolvent dispersion, and to subsequently adjust the pH to above 7 with a suitable agent such as triethylamine. At pH's less than 7, the dispersions are not always stable and the resin tends to precipitate out.

The aqueous dispersions may be applied to metal, wood, or other substrates by any conventional means such as casting, brushing, spraying, or electrocoating. They are then air dried at ambient or elevated temperatures, and may optionally be baked at temperatures up to about 150° C. Drying times as well as hardness values are directly related to the acid values and the molecular weights. Generally, the lower the acid value and the higher the molecular weight, the shorter the drying time and the harder the film.

It is understood that drying agents, pigments, surfactants, stabilizers, suspending agents, and other coating composition additives as known in the art may also be added to the instant aqueous dispersions.

The following examples are intended only to further illustrate the invention and are not intended to limit the scope of the invention which is defined by the claims.

EXAMPLES 1–15

A. Aminolysis

For each of Examples 1–15, a three-necked, round-bottom flask fitted with a nitrogen ebulator, dropping funnel, and stirrer was charged with dry, distilled diethanolamine (0.2 mole) and heated to 100°–105° C. After addition of sodium methoxide catalyst (0.035 mole), linseed oil (0.1 mole) was added dropwise over 15–20 minutes. The reaction was maintained at approximately 100° C. during oil addition and was held at that temperature for an additional 15–20 minutes. By titration it was determined that less than 0.25% unreacted diethanolamine remained in the reaction mixture. Thin-layer chromatography on precoated silica gel plates with a 70% diethyl ether-30% hexane-solvent system indicated two major components were formed: linseed 2-monoglyceride and N,N-bis(2)-hydroxyethyl linseed amide in a 1:2 ratio. Only a trace of linseed diglyceride was observed.

B. Half Ester Formation

After cooling to 85° C., phthalic anhydride was added to the reaction mixture in the amounts as shown in the table in order to produce the half esters. Stoichiometric quantities of triethylamine were then added to form the amide salts of the carboxyls present.

C. Urethane Modification

Dry toluene (70 ml.) was added to the reaction mixture and the temperature lowered to 50° C. Theoretical quantities of TDI (a mixture of 80%, 2,4-and 20% 2,6-isomers) as shown in the table was added in another 70-ml. portion of toluene to react with all the remaining hydroxyls to form the urethane derivative. The reaction mixture was held at 50° C. for approximately 2 hours until complete as judged by the disappearance of the —N=C=O band in the infrared at 2770 cm.$^{-1}$.

D. Aqueous Dispersions

For each of Examples 1–15, 2-butoxyethanol cosolvent was added to the urethane resin in toluene solution at the level indicated in the table. The toluene was preferentially removed by distillation under reduced pressure, leaving the resin in cosolvent. Deionized water was added and the mixture was dispersed by mechanical stirring to yield a 30% dispersion of resin in cosolvent and water. All samples were readily dispersible. The pH was then adjusted to 8–8.5 with triethylamine.

E. Film Coating and Testing

The aqueous dispersions prepared in step D were cast on steel Q panels (4 × 8 × 0.032 inches) and spread with a drawdown bar machined to give a dried film approximately 0.8 mil. thick. The films were air dried at 25° C. and 50% relative humidity. Tackfree times, as defined by Gardner ("Physical and Chemical Examination of Paints, Varnishes, Lacquers, and Colors," 12th Edition, H. A. Gardner Laboratory, Inc., Bethesda, Md., 1962) were determined on air-dried films by manually placing a small amount of sand on the film periodically. Hardness tests were made by the Sward Rocker technique. Alkali reagent and organic solvent resistance was measured by placing a 1.5-inch diameter watch glass, convex side down, on the surface of the film and introducing the reagent or solvent between the watch glass and film surface. The resistance was measured by the time it took for the film to dissolve or pucker. The alkali chemical was a 1% solution of commercial cleaning compound, "Spic 'n' Span", having a pH of about 9.9. The test solvent was xylene. The results of the tests are shown in the table.

EXAMPLE 16–17

Two 30% aqueous dispersions of 2-butoxyethanol and commercial coating resins of unknown chemical composition were prepared and their properties were compared to those of the urethane resins of Examples 1–15. The results appear in the table.

It is to be understood that the foregoing detailed description is given by way of illustration and that modification and variations may be made therein without departing from the spirit and scope of the invention.

Table

Physical and Film Properties of Urethane Resin Dispersions [a]

| Ex. | Total MG + HAFA[b] (moles) | Phthalic anhydride (moles) | TDI[c] (moles) | Acid value | Molecular weight[d] | Degree of polymerization | Resin/ 2-butoxy-ethanol ratio | Gardner visc. | Tack free time (hr.) | Rocker hardness days aging 1 | 4 | 7 | 14 | 21 | Spic 'n' Span resistance (hr.)[e,f] | Xylene resistance (hr.) |
|---|---|---|---|---|---|---|---|---|---|---|---|---|---|---|---|---|
| 1 | 0.3 | 0.254 | 0.173 | 70 | 1585 | 1.3 | 67/33 | <A | 21 | <1 | 12 | 14 | 14 | 16 | D<0.25 | 1 |
| 2 | 0.3 | 0.254 | 0.173 | 70 | 1585 | 1.3 | 75/25 | E | 21 | <1 | <1 | 16 | 18 | 17 | D<0.25 | 2.25 |
| 3 | 0.3 | 0.254 | 0.173 | 70 | 1585 | 1.3 | 85/15 | X | 21 | <1 | <1 | 11 | 14 | 14 | D<0.25 | 2.25 |
| 4 | 0.3 | 0.210 | 0.195 | 60 | 1835 | 1.8 | 67/33 | B | 20 | <1 | 17 | 20 | 21 | 19 | P 0.17 | 2.25 |
| 5 | 0.3 | 0.210 | 0.195 | 60 | 1835 | 1.8 | 75/25 | <A | >20 | <1 | <1 | <1 | 8 | 8 | P 0.17 | 2.25 |
| 6 | 0.3 | 0.210 | 0.195 | 60 | 1835 | 1.8 | 85/15 | W | 20 | <1 | <1 | 17 | 20 | 22 | P 0.17 | >6 <21 |
| 7 | 0.3 | 0.168 | 0.216 | 50 | 2230 | 2.5 | 67/33 | H | 0.75 | 10 | 26 | 30 | 36 | 40 | P 3.75 | >240 |
| 8 | 0.3 | 0.168 | 0.216 | 50 | 2230 | 2.5 | 75/25 | Z3 | 0.33 | 14 | 21 | 27 | 28 | 29 | P 2 | >240 |

Table-continued
Physical and Film Properties of Urethane Resin Dispersions[a]

| Ex. | Total MG + HAFA[b] (moles) | Phthalic anhydride (moles) | TDI[c] (moles) | Acid value | Molecular weight[d] | Degree of polymerization | Resin/ 2-butoxy-ethanol ratio | Gardner visc. | Tack free time (hr.) | Rocker hardness days aging 1 | 4 | 7 | 14 | 21 | Spic 'n' Span resistance (hr.)[e,f] | Xylene resistance (hr.) |
|---|---|---|---|---|---|---|---|---|---|---|---|---|---|---|---|---|
| 9  | 0.3 | 0.168 | 0.216 | 50 | 2230 | 2.5 | 85/15 | Z3-4 | 0.42 | 9  | 18 | 34 | 38 | 34 | P 1.5  | >240 |
| 10 | 0.3 | 0.130 | 0.235 | 40 | 2650 | 3.3 | 67/33 | V    | 0.58 | 30 | 36 | 34 | 43 | 36 | P 2.5  | >240 |
| 11 | 0.3 | 0.130 | 0.235 | 40 | 2650 | 3.3 | 75/25 | Z3   | 0.42 | 12 | 16 | 27 | 35 | 39 | P 1.25 | >240 |
| 12 | 0.3 | 0.130 | 0.235 | 40 | 2650 | 3.3 | 85/15 | >Z6  | 0.58 | 14 | 30 | 42 | 48 | 51 | P 3    | >240 |
| 13 | 0.3 | 0.094 | 0.253 | 30 | 3710 | 5.3 | 67/33 | Z5   | 0.42 | 40 | 47 | 50 | 54 | 56 | P 6    | >240 |
| 14 | 0.3 | 0.094 | 0.253 | 30 | 3710 | 5.3 | 75/25 | >Z6  | 0.33 | 36 | 52 | 54 | 60 | 62 | P 5.75 | >240 |
| 15 | 0.3 | 0.094 | 0.253 | 30 | 3710 | 5.3 | 85/15 | >>Z6 | 0.33 | 21 | 45 | 49 | 56 | 53 | P 5.75 | >240 |
| 16 | —   | —     | —     | 37 | —    | —   | 75/25 | B    | 0.83 | —  | 32 | 34 | 38 | 40 | P 26   | <1 |
| 17 | —   | —     | —     | 41 | —    | —   | 75/25 | C    | 13   | —  | 23 | 24 | 26 | 29 | P 8    | <1 |

[a] 30% by weight resin in dispersion.
[b] MG = 2-monoglyceride; HAFA = N,N-bis hydroxyalkyl fatty amides.
[c] TDI = tolylene diisocyanate.
[d] Calculated from acid value.
[e] 1% solution.
[f] D = 0 dissolved; P = puckered.

We claim:

1. A method of preparing water-dispersible urethane resin coating compositions comprising the following steps:
   a. amidating a drying or semidrying triglyceride oil with a diolamine in an oil:amine ratio of about 1:2 to yield a mixture of 2-monoglycerides and N,N-bis hydroxyalkyl fatty amides in a 2-monoglyceride:N,N-bis fatty amide ratio of approximately 1:2;
   b. reacting the mixture of 2-monoglycerides and N,N-bis hydroxyalkyl fatty amides from step (a) with a sufficient amount of an anhydride under sufficient conditions to convert a portion of said 2-monoglycerides and said N,N-bis hydroxyalkyl fatty amides to the corresponding 2-monoglyceride and N,N-bis hydroxyalkyl fatty amide half esters and to provide an acid value in the range of about 30–70 in said urethane resin coating compositions;
   c. neutralizing unesterified anhydride carboxyl groups on said 2-monoglyceride and N,N-bis hydroxyalkyl fatty amide half esters from step (b);
   d. reacting the resultant 2-monoglyceride, 2-monoglyceride half ester, N,N-bis hydroxyalkyl fatty amide, and N,N-bis hydroxyalkyl fatty amide half ester mixture from step (c) with a diisocyanate in a molar ratio of diisocyanate:2-monoglyceride + N,N-bis-hydroxyalkyl fatty amide of from about 0.85:1 to about 0.58:1, thereby polymerizing the components of said mixture into a urethane resin; and
   e. recovering said urethane resin prepared in step (d).

2. The method of preparing water-dispersible urethane resin coating compositions as described in claim 1 wherein in step (a) said triglyceride oil is linseed oil and said diolamine is diethanolamine.

3. The method of preparing water-dispersible urethane resin coating compositions as described in claim 1 wherein the step (b) said anhydride is phthalic anhydride in an amount sufficient to provide an acid value in the range of 30–50 in said compositions.

4. The method of preparing water-dispersible urethane resin coating compositions as described in claim 1 wherein in step (b) said sufficient conditions are a temperature in the range of about 80°–100° C. for a time of approximately 0.5 hour.

5. The method of preparing water-dispersible urethane resin coating compositions as described in claim 1 wherein in step (c) said carboxyl groups are neutralized by the addition of a stoichiometric amount of triethylamine.

6. The method of preparing water-dispersible urethane resin coating compositions as described in claim 1 wherein in step (d) said diisocyanate is tolylene diisocyanate in an amount sufficient to react with all of the free hydroxyls of said 2-monoglyceride, 2-monoglyceride half ester, N,N-bis hydroxyalkyl fatty amide, and N,N-bis hydroxyalkyl fatty amide half ester mixture.

7. The method of preparing water-dispersible urethane resin coating compositions as described in claim 1 and further comprising the following step:
   f. dispersing said recovered resin from step (e) in a water-cosolvent mixture at a 10–30% level of concentration and a resin:cosolvent ratio of from about 50:50 to about 90:10.

8. The method of preparing water-dispersible urethane resin coating compositions as described in claim 7 wherein said cosolvent is 2-butoxyethanol.

9. Water-dispersible urethane resin coating compositions prepared by the process of claim 1.

10. Water-dispersible urethane resin coating compositions prepared by the process of claim 2.

11. Water-dispersible urethane resin coating compositions prepared by the process of claim 3.

12. Water-dispersible urethane resin coating compositions prepared by the process of claim 6.

13. Water-dispersible urethane resin coating compositions prepared by the process of claim 8.

* * * * *

UNITED STATES PATENT OFFICE
CERTIFICATE OF CORRECTION

Patent No. 4,094,838           Dated June 13, 1978

Inventor(s)  Wilma J. Schneider and Lyle E. Gast

It is certified that error appears in the above-identified patent and that said Letters Patent are hereby corrected as shown below:

Column 4, line 47, cancel "2770 cm.$^{-1}$" and insert -- 2270 cm.$^{-1}$ -- .
Column 5, line 50, cancel "amide" and insert -- amine -- .
Column 6, line 7, cancel "2770 cm.$^{-1}$" and insert -- 2270 cm.$^{-1}$ -- .

Signed and Sealed this

Fifth Day of December 1978

[SEAL]

Attest:

RUTH C. MASON
Attesting Officer

DONALD W. BANNER
Commissioner of Patents and Trademarks